US012421675B2

(12) United States Patent
Rembisz et al.

(10) Patent No.: US 12,421,675 B2
(45) Date of Patent: Sep. 23, 2025

(54) SELF-BALANCING UNI-DRUM COMPACTOR

(71) Applicant: Volvo Construction Equipment AB, Eskilstuna (SE)

(72) Inventors: Lukasz Krzysztof Rembisz, Medlow (PL); Fares Beainy, Mechanicsville, PA (US); Rafal Robert Cisowski, Jelcz-Laskowice (PL)

(73) Assignee: Volvo Construction Equipment AB, Eskilstuna (SE)

( * ) Notice: Subject to any disclaimer, the term of this patent is extended or adjusted under 35 U.S.C. 154(b) by 989 days.

(21) Appl. No.: 17/609,920

(22) PCT Filed: May 10, 2019

(86) PCT No.: PCT/IB2019/053896
§ 371 (c)(1),
(2) Date: Nov. 9, 2021

(87) PCT Pub. No.: WO2020/229873
PCT Pub. Date: Nov. 19, 2020

(65) Prior Publication Data
US 2022/0228328 A1 Jul. 21, 2022

(51) Int. Cl.
*E01C 19/28* (2006.01)
*B06B 1/16* (2006.01)

(52) U.S. Cl.
CPC .............. *E01C 19/286* (2013.01); *B06B 1/16* (2013.01)

(58) Field of Classification Search
CPC ................................ E01C 19/286; B06B 1/16
(Continued)

(56) References Cited

U.S. PATENT DOCUMENTS 72,653 A * 12/1867 Mann ...................... E01C 19/26 404/130
919,967 A * 4/1909 Slankard ................. E01C 19/26 404/130
(Continued)

FOREIGN PATENT DOCUMENTS

CN 107109807 A 8/2017
CN 109415879 A 3/2019
(Continued)

OTHER PUBLICATIONS

International Search Report and Written Opinion of the International Searching Authority, PCT/IB2019/053896, mailed Feb. 14, 2020, 14 pages.
(Continued)

*Primary Examiner* — Raymond W Addie
(74) *Attorney, Agent, or Firm* — Sage Patent Group

(57) ABSTRACT

A surface compactor machine includes an unsprung mass including a cylindrical drum and a cylindrical spool disposed within the cylindrical drum, and a sprung mass rotationally coupled to the cylindrical spool. The sprung mass has a center of gravity that is lower than the center of gravity of the unsprung mass when the surface compactor machine is in a stationary position. The sprung mass includes a traction system that rotates the sprung mass relative to the cylindrical spool. When the traction system rotates the sprung mass relative to the cylindrical spool, the second center of gravity of the sprung mass is rotated out of vertical alignment with the first center of gravity of the unsprung mass, thereby imparting torque to the cylindrical spool that causes rotation of the cylindrical drum.

20 Claims, 6 Drawing Sheets

(58) Field of Classification Search
USPC .......................................................... 404/117
See application file for complete search history.

(56) References Cited

U.S. PATENT DOCUMENTS

| | | | | |
|---|---|---|---|---|
| 2,549,182 | A | 4/1951 | Ekenstam | |
| 2,611,443 | A | 9/1952 | Paramythioti | |
| 3,153,993 | A * | 10/1964 | Keppler | E01C 19/288 404/117 |
| 5,934,824 | A | 8/1999 | Vural | |
| 9,267,245 | B1 | 2/2016 | Braun | |
| 9,951,482 | B2 | 4/2018 | MacDonald | |
| 10,487,461 | B2 | 11/2019 | Budzianowski et al. | |
| 2012/0155961 | A1 * | 6/2012 | Norton | E02D 3/02 404/117 |
| 2014/0133909 | A1 | 5/2014 | Hansen et al. | |

FOREIGN PATENT DOCUMENTS

| | | | |
|---|---|---|---|
| DE | 19529115 | A1 | 3/1997 |
| FR | 761174 | A | 3/1934 |
| FR | 1176973 | A | 4/1959 |
| FR | 2426116 | A1 | 12/1979 |
| FR | 1431592 | A | 3/1996 |
| GB | 498597 | A | 1/1939 |

OTHER PUBLICATIONS

Chinese First Office Action dated Sep. 1, 2022 for Chinese Patent Application No. 201980096194.0, 15 pages (including English summary).

* cited by examiner

SELF-BALANCING UNI-DRUM COMPACTOR

CROSS REFERENCE TO RELATED APPLICATIONS

This application is a 35 U.S.C. § 371 national stage application of PCT International Application No. PCT/IB2019/053896 filed on May 10, 2019, the disclosure and content of which is incorporated by reference herein in its entirety.

FIELD

The inventive concepts relate to surface compactors machines, and, in particular, to uni-drum surface compactor machines.

BACKGROUND

Surface compactor machines, or surface compactors, are used to compact a variety of substrates, such as asphalt and soil. Surface compactors are provided with one or more compacting surfaces for this purpose. For example, a roller compactor may be provided with one or more cylindrical drums that provide compacting surfaces for compacting soil, asphalt, or other materials.

Roller compactors use the weight of the compactor to compress the surface being rolled. In addition, one or more of the drums of some roller compactors may vibrate to induce additional mechanical compaction of the surface being rolled.

Heavy duty surface compactors typically have two rollers or drums, e.g., front and back rollers, that provide compaction of the surface. An operator cab may be positioned between the rollers. The drums in such a compactor, referred to as tandem drums, may vibrate or be static, and may be driven by a motor mounted next to or under the operator cab.

A single-drum (or uni-drum) compactor only includes a single compacting drum. A conventional single drum compactor may include drive tires that propel the compactor and an operator cab positioned between the drum and the drive tires. For light duty, walk behind single drum compactors are also known. Such compactors may be driven by motors provided within the drum.

SUMMARY

This summary is provided to introduce simplified concepts that are further described below in the Detailed Description. This summary is not intended to identify essential features of the claimed subject matter, nor is it intended for use in determining the scope of the claimed subject matter.

A surface compactor machine according to some embodiments includes a cylindrical drum including a cylindrical drum shell and a cylindrical spool disposed within the cylindrical drum shell and supporting the cylindrical drum shell, and an eccentric assembly mechanically coupled to the cylindrical drum and arranged to impart vibration to the cylindrical drum when the eccentric assembly is rotated. The cylindrical drum and the eccentric assembly form part of an unsprung mass having a combined first center of gravity. A head plate is affixed to the cylindrical spool through a shock isolator, and a sprung mass is rotationally coupled to the head plate along an axis of rotation of the cylindrical drum shell and the cylindrical spool. The sprung mass includes a plurality of components having a combined second center of gravity that is lower than the first center of gravity when the surface compactor machine is in a stationary position. The sprung mass includes a traction system including a traction motor and a slewing gear coupled to the traction motor. The traction system rotates the sprung mass relative to the head plate about the axis of rotation.

A surface compactor machine according to further embodiments includes an unsprung mass having a first center of gravity, the unsprung mass including a cylindrical drum including a cylindrical drum shell and a cylindrical spool disposed within the cylindrical drum shell and supporting the cylindrical drum shell, and a sprung mass rotationally coupled to the cylindrical spool along an axis of rotation of the cylindrical drum shell and the cylindrical spool. The sprung mass has a second center of gravity that is lower than the first center of gravity when the surface compactor machine is in a stationary position. The sprung mass includes a traction system including a traction motor and a slewing gear coupled to the traction motor. The traction system is configured to rotate the sprung mass relative to the cylindrical spool about the axis of rotation. When the surface compactor machine is in the stationary position, the first center of gravity of the unsprung mass and the second center of gravity of the sprung mass are in vertical alignment, and when the traction system rotates the sprung mass relative to the cylindrical spool about the axis of rotation, the second center of gravity of the sprung mass is rotated out of vertical alignment with the first center of gravity of the unsprung mass, thereby imparting torque to the cylindrical spool that causes rotation of the cylindrical drum.

A surface compactor machine according to further embodiments incudes a cylindrical drum including a cylindrical drum shell and a cylindrical spool disposed within the cylindrical drum shell and supporting the cylindrical drum shell, the cylindrical drum shell and the cylindrical spool having an axis of rotation, and an eccentric shaft mechanically coupled to the cylindrical drum and arranged to impart vibration to the cylindrical drum when the eccentric shaft is rotated. The cylindrical drum and the eccentric shaft form part of an unsprung mass having a combined first center of gravity. The machine further includes a head plate affixed to the cylindrical spool through a shock isolator, and a vibration motor coupled to the vibration shaft. The vibration motor is positioned outside the cylindrical spool and is coupled to the vibration shaft through a constant velocity joint.

The machine further includes a sprung mass rotationally coupled to the head plate along the axis of rotation and having a second center of gravity that is lower than the first center of gravity when the surface compactor machine is in a stationary position.

ASPECTS OF THE INVENTIVE CONCEPTS

In one aspect, a surface compactor machine includes a cylindrical drum including a cylindrical drum shell and a cylindrical spool disposed within the cylindrical drum shell and supporting the cylindrical drum shell, and an eccentric assembly mechanically coupled to the cylindrical drum and arranged to impart vibration to the cylindrical drum when the eccentric assembly is rotated. The cylindrical drum and the eccentric assembly form part of an unsprung mass having a combined first center of gravity. A head plate is affixed to the cylindrical spool through a shock isolator, and a sprung mass is rotationally coupled to the head plate along an axis of rotation of the cylindrical drum shell and the cylindrical spool. The sprung mass includes a plurality of components having a combined second center of gravity that is lower than the first center of gravity when the surface compactor machine is in a stationary position. The sprung mass includes a traction system including a traction motor and a slewing gear coupled to the traction motor. The traction system rotates the sprung mass relative to the head plate about the axis of rotation.

In an aspect, when the surface compactor machine is in the stationary position, the first center of gravity of the unsprung mass and the second center of gravity of the sprung mass are in vertical alignment.

In an aspect, when the traction system rotates the sprung mass relative to the head plate about the axis of rotation, the second center of gravity of the sprung mass is rotated out of vertical alignment with the first center of gravity of the unsprung mass, thereby imparting torque to the cylindrical drum that causes rotation of the cylindrical drum.

In an aspect, the rotation imparted to the cylindrical drum imparts linear motion of the cylindrical drum in a direction from the first center of gravity of the unsprung mass toward the second center of gravity of the sprung mass.

In an aspect, the shock isolator provides vibrational isolation of the sprung mass from vibration of the cylindrical drum generated by the eccentric assembly.

In an aspect, the eccentric assembly includes an eccentric shaft disposed with in the cylindrical drum and rotationally driven by a vibration motor.

In an aspect, the slewing gear is coupled to the head plate.

In an aspect, the traction motor is coupled to the slewing gear through a planetary gear.

In an aspect, the traction system includes a drive shaft coupled to the traction motor and the slewing gear and a safety brake coupled to the drive shaft.

In an aspect, the vibration motor is positioned outside the head plate relative to the cylindrical spool and is coupled to the eccentric shaft through a constant velocity joint.

In an aspect, the surface compactor machine further includes a frame forming part of the sprung mass, wherein the traction system is mounted to the frame.

In an aspect, the frame extends partially within a space defined by the cylindrical drum shell adjacent the cylindrical spool, and wherein the drive motor is disposed at least partially within the space defined by the cylindrical drum shell adjacent the cylindrical spool.

In an aspect, the sprung mass further includes an engine mounted on the frame, a counterweight mounted on the frame, and/or a bumper mounted on the frame.

In an aspect, the surface compactor machine further includes a second head plate affixed to the second cylindrical spool through a second shock isolator, and a second traction system including a second traction motor and a second slewing gear coupled to the second traction motor, wherein the second traction system is configured to rotate the sprung mass relative to the second head plate about the axis of rotation.

In another aspect, a surface compactor machine includes an unsprung mass having a first center of gravity, the unsprung mass including a cylindrical drum including a cylindrical drum shell and a cylindrical spool disposed within the cylindrical drum shell and supporting the cylindrical drum shell, and a sprung mass rotationally coupled to the cylindrical spool along an axis of rotation of the cylindrical drum shell and the cylindrical spool. The sprung mass has a second center of gravity that is lower than the first center of gravity when the surface compactor machine is in a stationary position. The sprung mass includes a traction system including a traction motor and a slewing gear coupled to the traction motor. The traction system is configured to rotate the sprung mass relative to the cylindrical spool about the axis of rotation. When the surface compactor machine is in the stationary position, the first center of gravity of the unsprung mass and the second center of gravity of the sprung mass are in vertical alignment, and when the traction system rotates the sprung mass relative to the cylindrical spool about the axis of rotation, the second center of gravity of the sprung mass is rotated out of vertical alignment with the first center of gravity of the unsprung mass, thereby imparting torque to the cylindrical spool that causes rotation of the cylindrical drum.

In an aspect, the unsprung mass further includes an eccentric assembly mechanically coupled to the cylindrical drum and arranged to impart vibration to the cylindrical drum when the eccentric assembly is rotated.

In an aspect, the surface compactor machine further includes a head plate affixed to the cylindrical spool through a shock isolator and coupled to the slewing gear of the traction system, wherein the traction system is configured to rotate the sprung mass relative to the head plate about the axis of rotation.

In an aspect, the slewing gear includes a slewing gear coupled to the head plate.

In an aspect, the eccentric assembly includes an eccentric shaft, the surface compactor machine further includes a vibration motor coupled to the eccentric shaft, wherein the vibration motor is positioned outside the head plate relative to the cylindrical spool and is coupled to the eccentric shaft through a constant velocity joint.

In an aspect, the surface compactor machine further includes a frame forming part of the sprung mass, wherein the traction system is mounted to the frame, wherein the frame extends partially within a space defined by the cylindrical drum shell adjacent the cylindrical spool, and wherein the drive motor is disposed at least partially within the space defined by the cylindrical drum shell adjacent the cylindrical spool.

In another aspect, a surface compactor machine incudes a cylindrical drum including a cylindrical drum shell and a cylindrical spool disposed within the cylindrical drum shell and supporting the cylindrical drum shell, the cylindrical drum shell and the cylindrical spool having an axis of rotation, and an eccentric shaft mechanically coupled to the cylindrical drum and arranged to impart vibration to the cylindrical drum when the eccentric shaft is rotated. The cylindrical drum and the eccentric shaft form part of an unsprung mass having a combined first center of gravity. The machine further includes a head plate affixed to the cylindrical spool through a shock isolator, and a vibration motor coupled to the vibration shaft. The vibration motor is positioned outside the cylindrical spool and is coupled to the vibration shaft through a constant velocity joint. The surface compactor machine further includes a sprung mass rotationally coupled to the head plate along the axis of rotation and having a second center of gravity that is lower than the first center of gravity when the surface compactor machine is in a stationary position.

In an aspect, the sprung mass includes a traction system including a traction motor and a slewing gear coupled to the traction motor, wherein the traction system is configured to rotate the sprung mass relative to the unsprung mass about the axis of rotation.

In an aspect, when the surface compactor machine is in the stationary position, the first center of gravity of the unsprung mass and the second center of gravity of the sprung mass are in vertical alignment.

In an aspect, when the traction system rotates the sprung mass relative to the head plate about the axis of rotation, the second center of gravity of the sprung mass is rotated out of vertical alignment with the first center of gravity of the unsprung mass, thereby imparting torque to the cylindrical drum that causes rotation of the cylindrical drum.

In an aspect, the rotation imparted to the cylindrical drum imparts linear motion of the cylindrical drum in a direction from the first center of gravity of the unsprung mass toward the second center of gravity of the sprung mass.

DETAILED DESCRIPTION OF EMBODIMENTS

Figure 1:
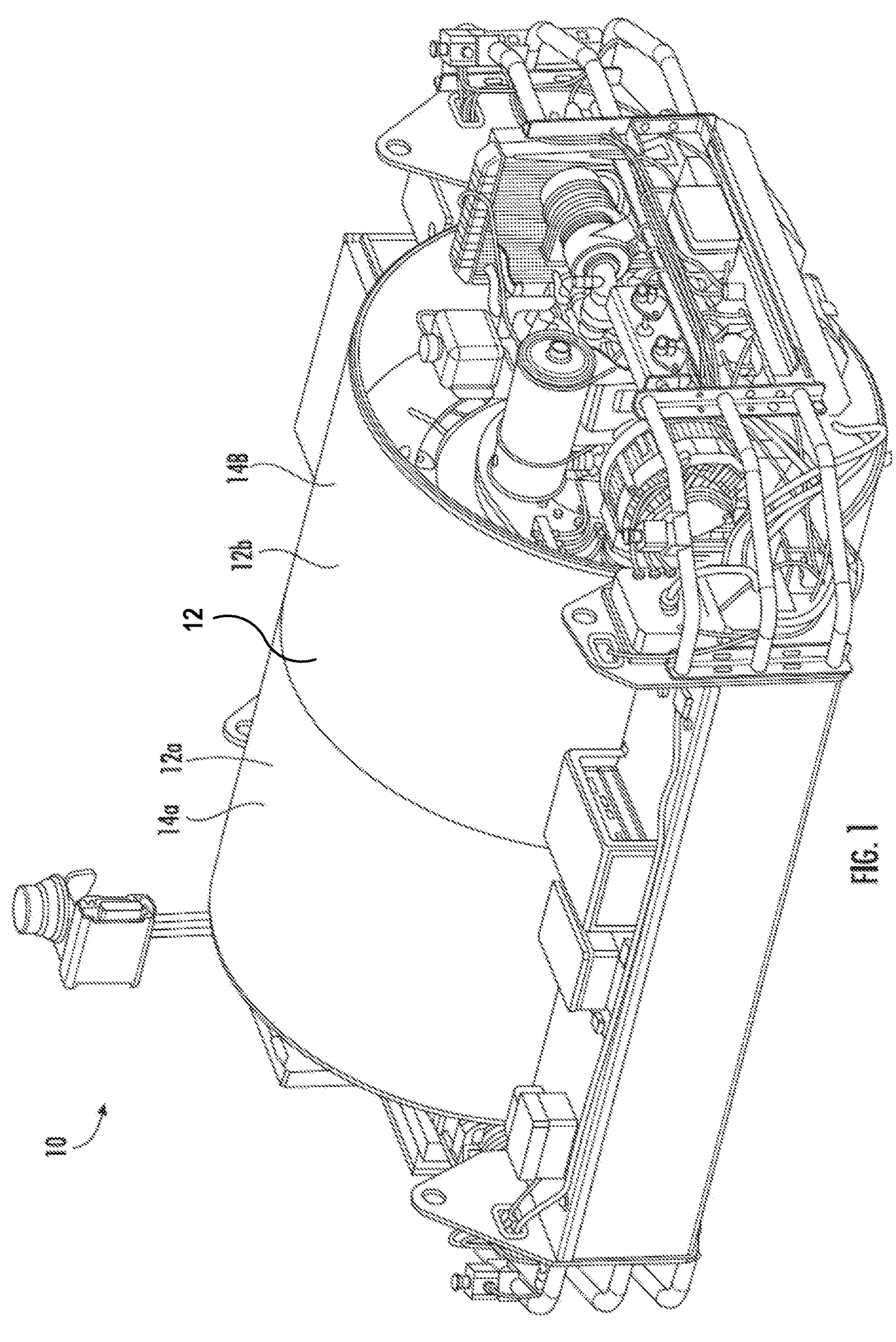
FIG. 1 is a perspective view of a single drum surface compactor machine according to some embodiments.

FIG. 1 is a perspective view of a single drum surface compactor machine 10 according to some embodiments. As will be appreciated, a single drum surface compactor machine may be a self-propelled autonomous or semi-autonomous vehicle for compacting a substrate.

Referring to FIG. 1, the surface compactor machine 10 has a split drum construction. In particular, the surface compactor machine 10 includes a split cylindrical drum 12 including first and second cylindrical drums 12*a*, 12*b* arranged along a common axis of rotation. Each of the cylindrical drums 12*a*, 12*b* includes an independent drive system and can rotate independently to allow the surface compactor machine 10 to move forward/backward, steer left of right, and/or to change directions. Each of the cylindrical drums 12*a*, 12*b* includes a cylindrical drum shell 14*a*, 14*b* that contacts an underlying substrate. Compaction of the substrate is achieved as a result of the weight of the surface compactor machine 10 as it rolls over the substrate. Compaction of the substrate may be enhanced by vibration of the cylindrical drums 12*a*, 12*b*, as described in more detail below.

Figure 2:
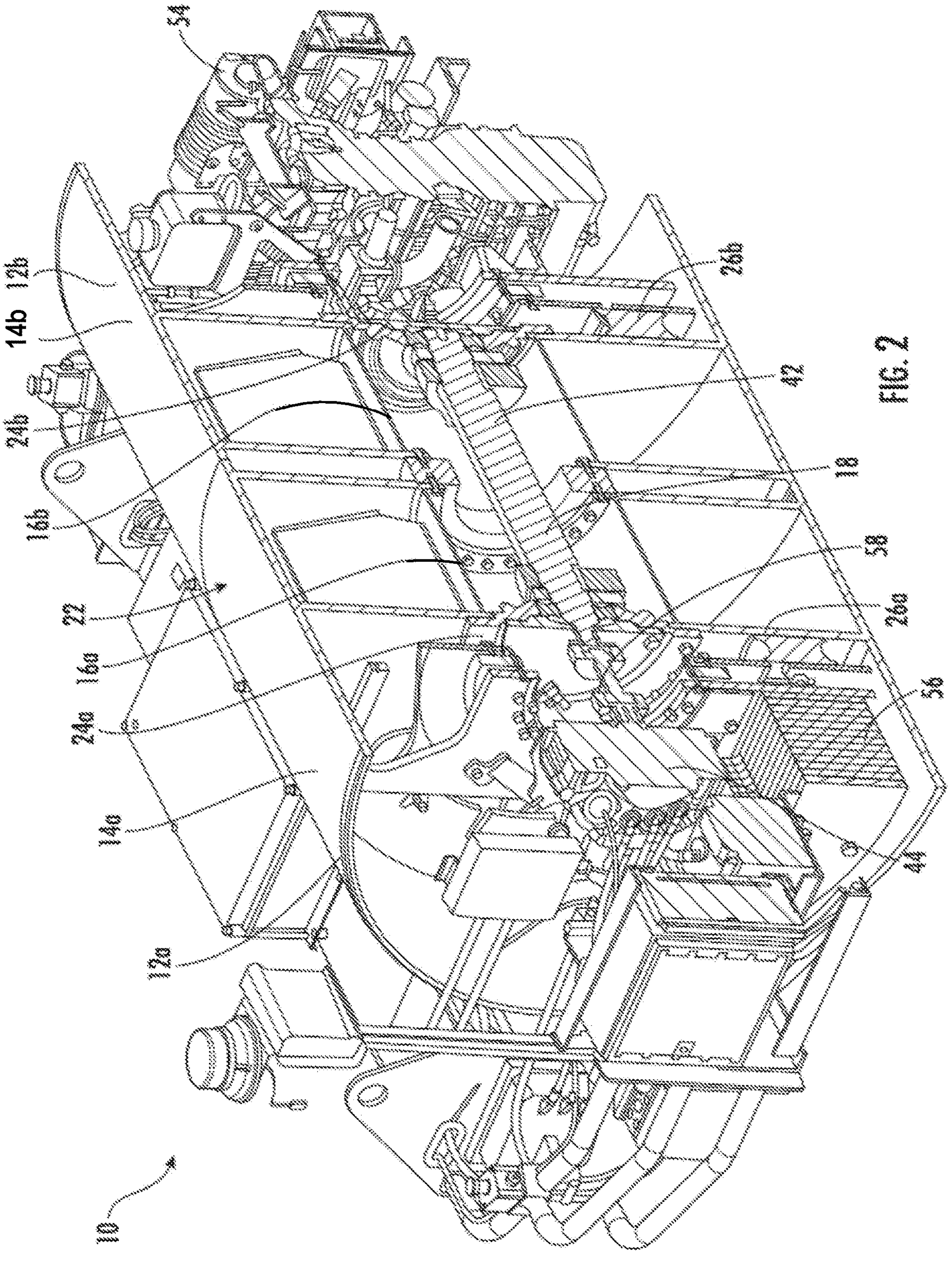
FIG. 2 is a cutaway perspective view of a single drum surface compactor machine according to some embodiments.
Figure 3:
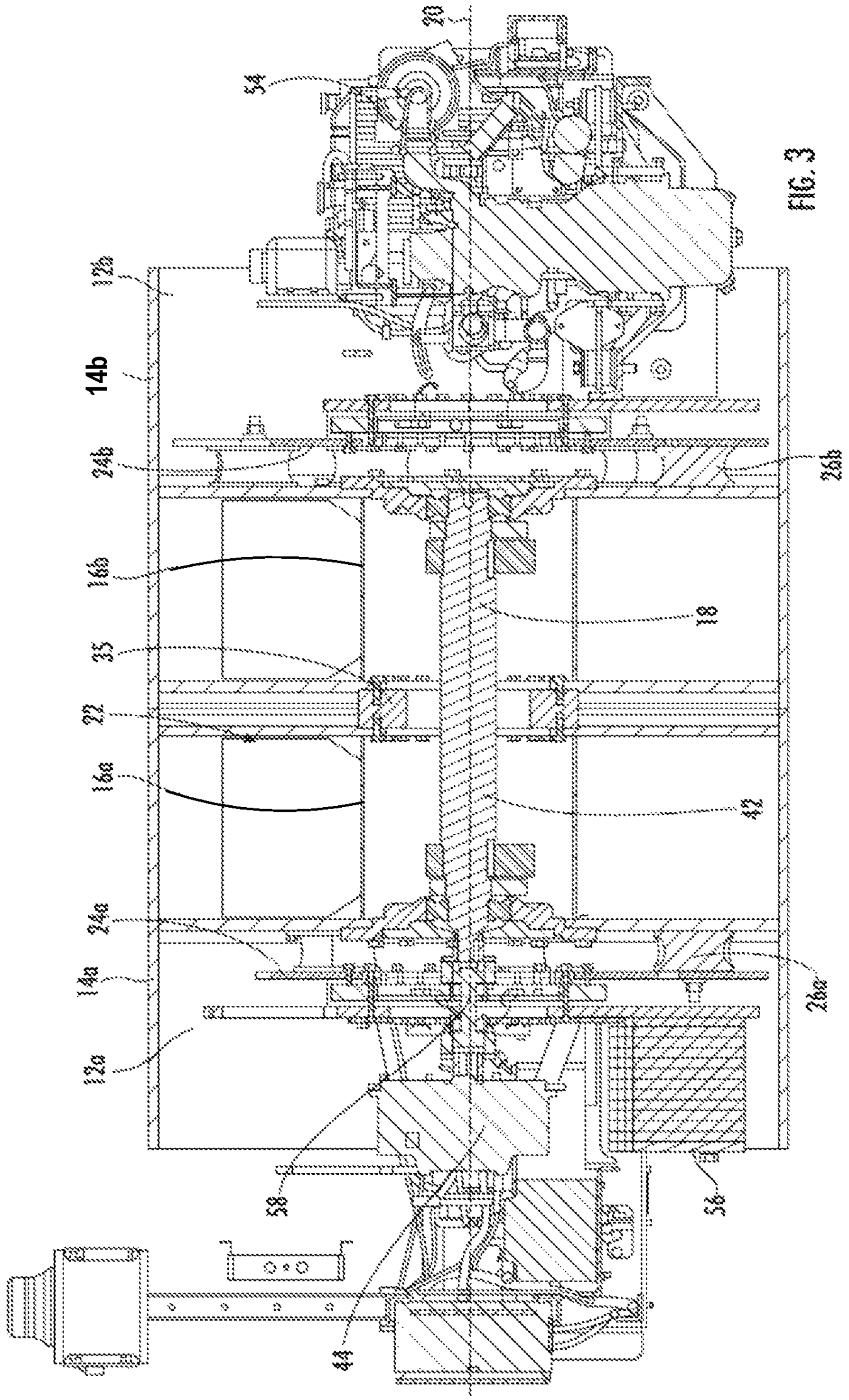
FIG. 3 is a side cutaway view of a single drum surface compactor machine according to some embodiments.
Figure 4:
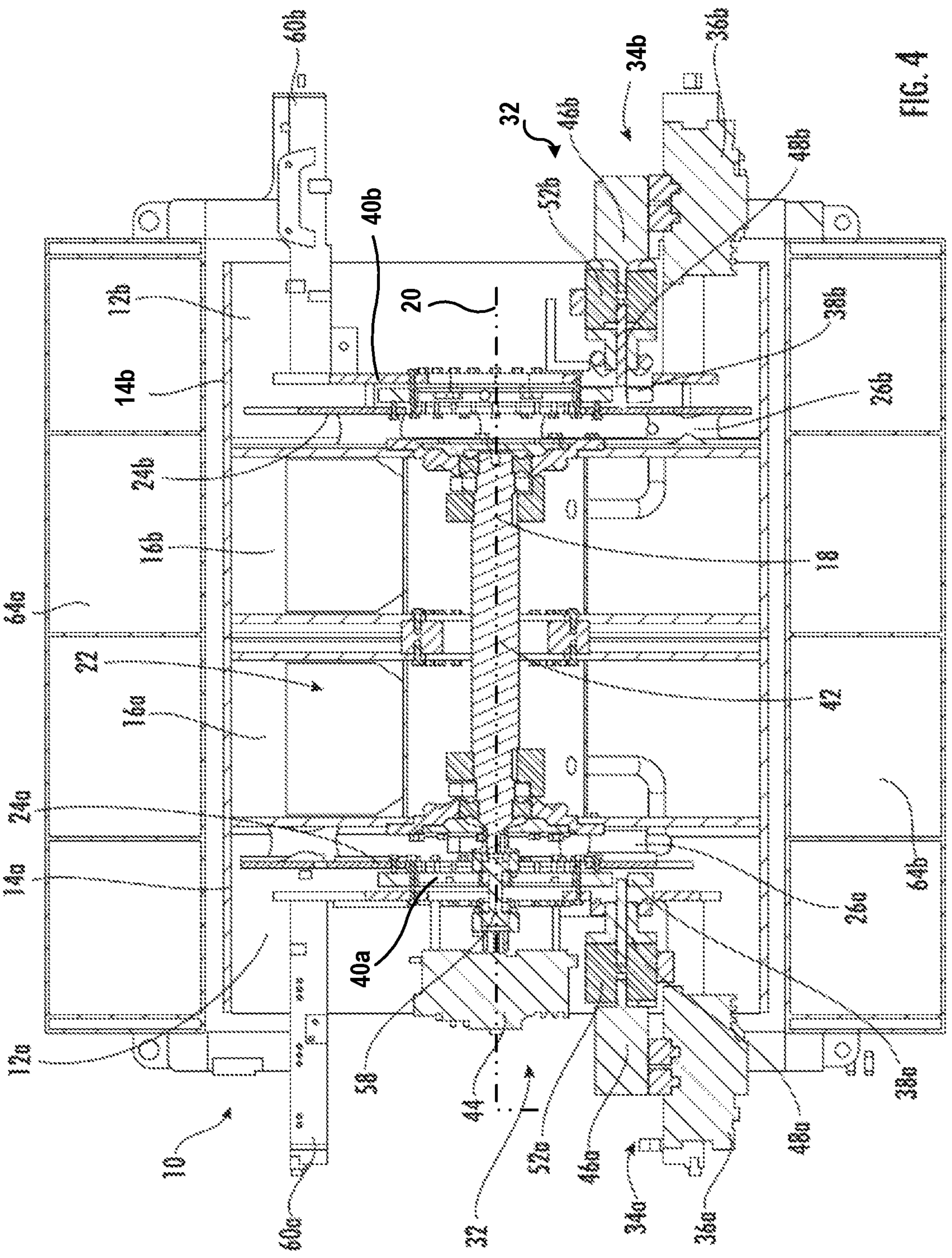
FIG. 4 is a plan cutaway view of a single drum surface compactor machine according to some embodiments.
Figure 5:
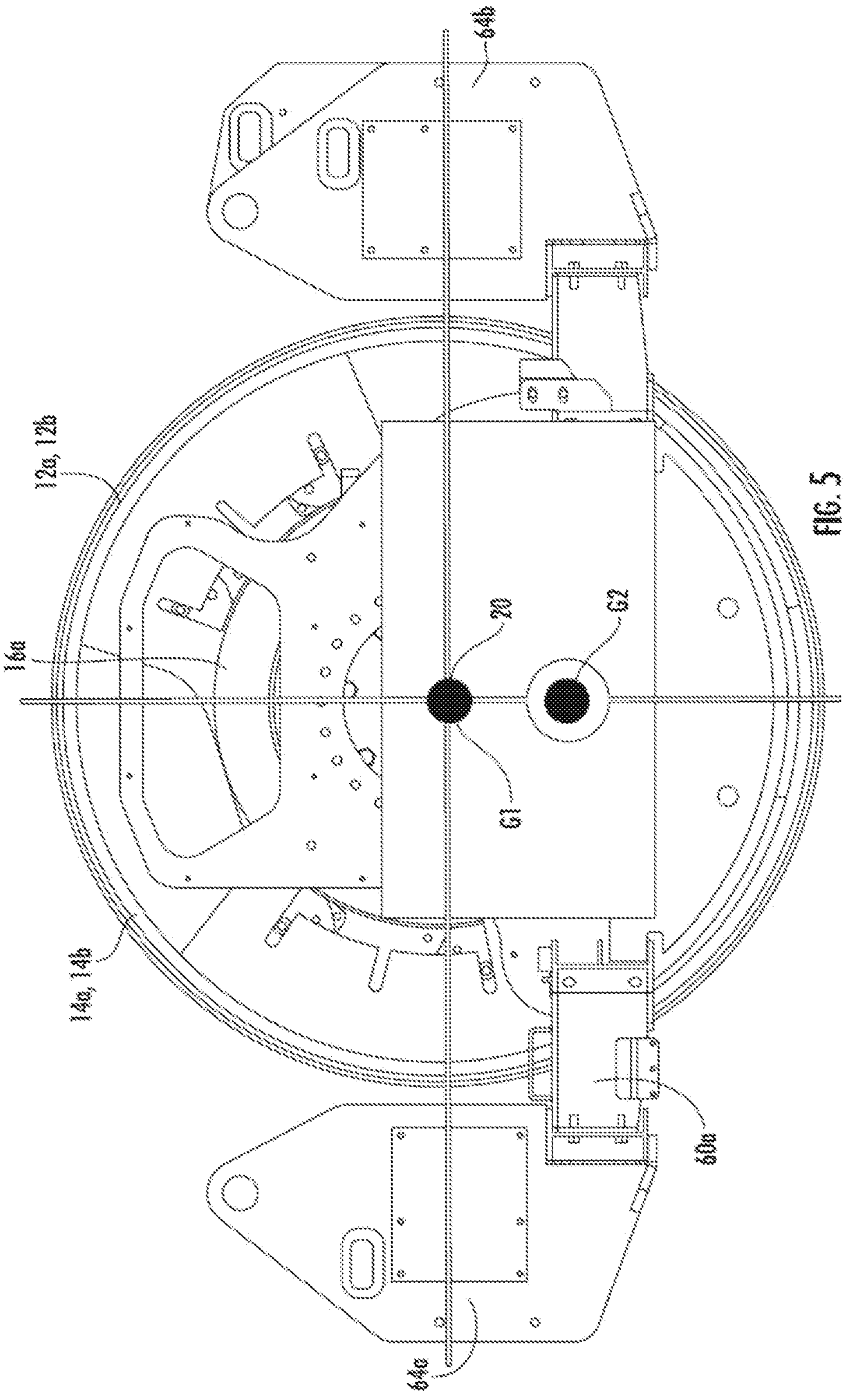
FIG. 5 is a side elevation of a single drum surface compactor machine according to some embodiments.

FIG. 2 is a cutaway perspective view, FIG. 3 is a side cutaway view, and FIG. 4 is a plan cutaway view of the surface compactor machine 10 showing various internal components of the surface compactor machine 10. FIG. 5 is a side elevation of the surface compactor machine 10.

Referring to FIGS. 1 to 5, each of the cylindrical drums 12*a*, 12*b* of the surface compactor machine 10 includes a cylindrical spool 16*a*, 16*b* disposed within the cylindrical drum shell 14*a*, 14*b*. As best seen in FIG. 3, the cylindrical drums 12*a*, 12*b* and the cylindrical spools 16*a*, 16*b* rotate around a common axis of rotation 20. The cylindrical spools 16*a*, 16*b* are coupled together by means of a slewing bearing 35 (FIG. 3), which allows independent rotation of the cylindrical drums 12*a*, 12*b* about the axis of rotation 20.

The surface compactor machine 10 includes an eccentric assembly 18 that is mechanically coupled to the cylindrical drums 12*a*, 12*b* and arranged to impart vibration to the cylindrical drum when the eccentric assembly 18 is rotated. The cylindrical drums 12*a*, 12*b* and the eccentric assembly 18 form part of an unsprung mass 22 having a combined first center of gravity G1 approximately near the axis of rotation 20 (FIG. 5). As will be described in more detail below, other components of the surface compactor machine 10 form a sprung mass 32 that is at least partially isolated from vibration of the unsprung mass 22 by means of shock isolators, although some vibration of the unsprung mass 22 may be transmitted through the shock isolators to the sprung mass 32.

Referring to FIG. 3, a head plate 24*a*, 24*b* is affixed to each cylindrical spool 16*a*, 16*b* through a respective set of shock isolators 26*a*, 26*b*. The shock isolators 26*a*, 26*b* provide vibrational isolation of the sprung mass 32 from vibration of the cylindrical drums 12*a*, 12*b* generated by rotation of the eccentric assembly 18. A frame 60*a*, 60*b* is mounted to the head plate 24*a*, 24*b* through a slewing gear 38*a*, 38*b*. A portion of the frame 60*a*, 60*b* may extend partially into a space defined by the cylindrical drum shell 14*a*, 14*b* adjacent the spool 16*a*, 16*b*. Elements of the sprung mass 32 may be mounted to the frame 60*a*, 60*b*.

The eccentric assembly includes an eccentric shaft 42 disposed within the cylindrical drums 12*a*, 12*b* and rotationally driven by a vibration motor 44 that is mounted outside the spools 16*a*, 16*b* in the illustrated embodiment. The vibration motor 44, which is mounted to the frame 60*a*, forms part of the sprung mass 32 and is at least partially isolated from vibration of the eccentric assembly 18. The vibration motor 44 is coupled to the eccentric shaft 42 through a constant velocity joint 58. The vibration motor 44 rotates the eccentric assembly to impart vibration to the drums 12*a*, 12*b* to enhance compaction of the substrate. The continuous velocity joint 58 is able to transfer high speed and bear with deflections of the shock isolators 26*a*, 26*b*. This construction enhances isolation of the electrical and electronical components from vibrations, since all electrical components are mounted on the cushioned frame 60*a*, 60*b*.

The sprung mass 32 includes a plurality of components having a combined second center of gravity G2 (FIG. 5) that is lower than the first center of gravity G1 when the surface compactor machine 10 is in a stationary position (i.e., the drums 12*a*, 12*b* are not rotating).

Referring to FIG. 4, the sprung mass 32 includes traction systems 34*a*, 34*b* for each of the drums 12*a*, 12*b*. The traction systems 34*a*, 34*b* each include a traction motor 36*a*, 36*b* and a slewing gear 38*a*, 38*b* coupled to the traction motor 36*a*, 36*b*. The traction motor 36*a*, 36*b* and slewing gear 38*a*, 38*b* are mounted to the frame 60*a*, 60*b*. The traction system includes a drive shaft 48*a*, 48*b* coupled to the traction motor 36*a*, 36*b* and the slewing gear 38*a*, 38*b*, and a safety brake 52*a*, 52*b* coupled to the drive shaft 48*a*, 48*b*. The traction motor 36*a*, 36*b* is coupled to the slewing gear 38*a*, 38*b* through a 90-degree planetary reduction gear 46*a*, 46*b*. The slewing gear 38*a*, 38*b* contacts a slewing bearing 40*a*, 40*b* that is coupled to the head plate 24*a*, 24*b*. As is known in the art, a slewing bearing permits independent rotation of the joined bodies. In this case, the slewing bearing 40*a*, 40*b*, which is centered on the axis of rotation 20, enables independent rotation of the sprung mass 32 connected to the frame 60*a*, 60*b* and the unsprung mass 22 connected to the head plate 24*a*, 24*b*. When the traction motor 36*a*, 36*b* turns the slewing gear 38*a*, 38*b* via the drive shaft 48*a*, 48*b*, the sprung mass 32 rotates about the axis of rotation 20 independently of the unsprung mass 22. That is, when the slewing gear 38*a*, 38*b* is driven by the traction motor 36*a*, 36*b* against the slewing bearing 40*a*, 40*b*, the sprung mass 32 rotates about the axis of rotation 20 relative to the unsprung mass 22.

Accordingly, in each drum 12*a*, 12*b*, the traction system 34*a*, 34*b* rotates the sprung mass 32 about the axis of rotation 20 relative to the head plate 24*a*, 24*b* and the unsprung mass 22. The sprung mass 32 is rotationally coupled to the head plate 24*a*, 24*b* along the axis of rotation 20 of the cylindrical drum shells 14*a*, 14*b* and the cylindrical spools 16*a*, 16*b* via the slewing bearings 40*a*, 40*b*.

As shown in FIG. 4, the traction systems 34*a*, 34*b* are offset from the central axis of rotation 20 of the drums 12*a*, 12*b*. This offset between the central axis of the traction motors 36*a*, 36*b* and the center of the drums 12*a*, 12*b* using slewing gears 38*a*, 38*b* allows the system to directly drive the eccentric assembly 18 along the central axis 20 of the drum 12*a* via the constant velocity joint 58.

The sprung mass 32 further includes a number of other components mounted to the frame 60*a*, 60*b* and that contribute to the mass of the sprung mass 32. For example, as shown in FIG. 3, the sprung mass 32 further includes an engine 54 mounted on the frame, a counterweight 56 mounted on the frame, and/or a bumper 64*a*, 64*b* mounted on the frame 60*a*, 60*b*. Water tanks may be mounted in the bumper 64*a*, 64*b* which may also add further mass to the sprung mass 32.

Figure 6:
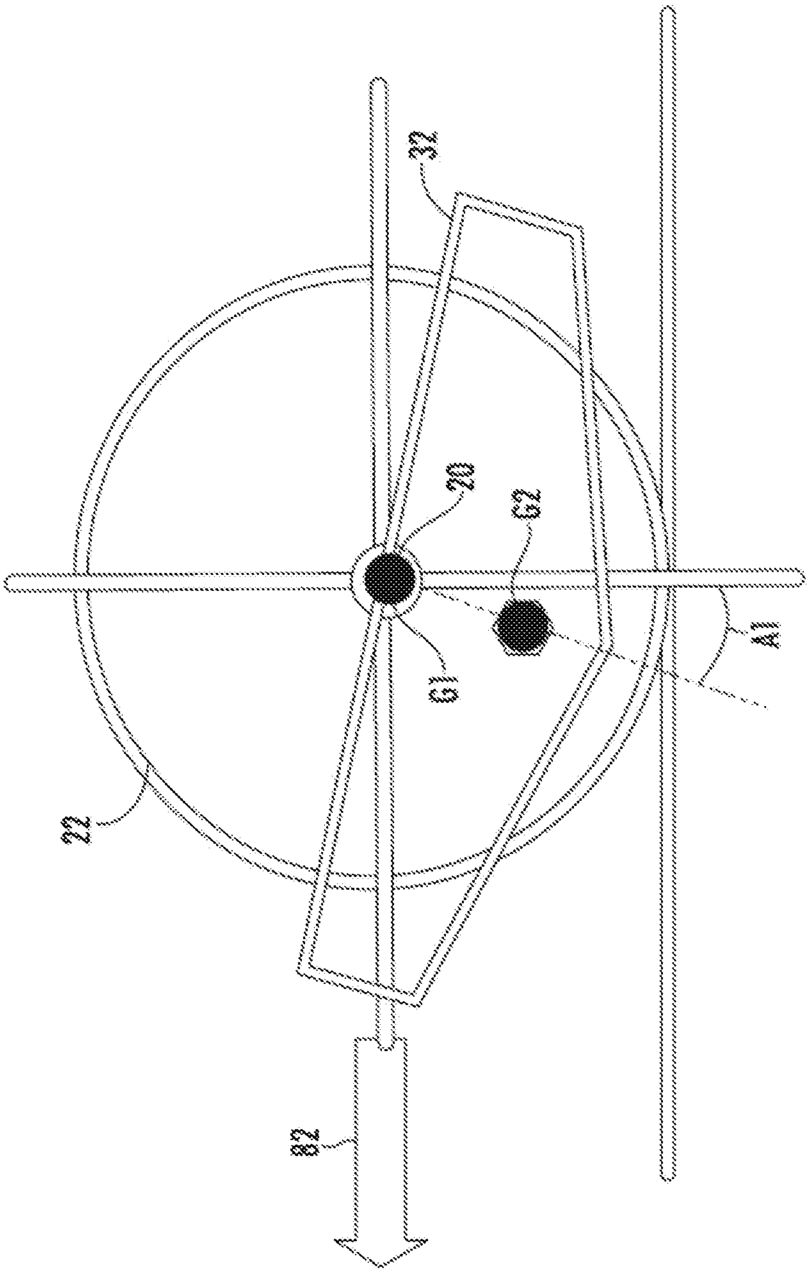
FIG. 6 is a schematic side elevation of a single drum surface compactor machine according to some embodiments.

Referring to FIGS. 5 and 6, when the surface compactor machine is in the stationary position, the first center of gravity G1 of the unsprung mass 22 and the second center of gravity G2 of the sprung mass 32 are in vertical alignment (FIG. 5).

When the traction system 34*a*, 34*b* rotates the sprung mass 32 relative to the head plate 24*a*, 24*b* about the axis of rotation 20 (for example, by an angle of rotation A1 shown in FIG. 6), the second center of gravity G2 of the sprung mass 32 is rotated out of vertical alignment with the first center of gravity G1 of the unsprung mass 22. In the example shown in FIG. 6, the second center of gravity G2 of the sprung mass 32 is rotated out of vertical alignment with the first center of gravity G1 of the unsprung mass 22. This rotation of the second center of gravity G2 of the sprung mass 32 relative to the first center of gravity G1 of the unsprung mass 22 lifts the second center of gravity G2 of the sprung mass 32. The gravitational force on the sprung mass 32 causes an imbalance within the surface compactor machine 10. As the force of gravity attempts to correct this imbalance by pulling the second center of gravity G2 of the sprung mass 32 back down beneath the first center of gravity of the unsprung mass 22, friction between the ground and the cylindrical drum 12*a*, 12*b* imparts torque to the cylindrical drum 12*a*, 12*b*, which in turn causes rotation of the cylindrical drum 12*a*, 12*b* in a direction toward the rotated center of gravity of the sprung mass 32.

That is, the rotation imparted to the cylindrical drum 12*a*, 12*b* imparts linear (forward or backward) motion of the cylindrical drum 12*a*, 12*b* in a direction 82 from the first center of gravity G1 of the unsprung mass 22 toward the second center of gravity G2 of the sprung mass 32.

Accordingly, a surface compactor machine 10 according to some embodiments includes an unsprung mass 22 having a first center of gravity, the unsprung mass including a cylindrical drum 12*a*, 12*b* including a cylindrical drum shell 14*a*, 14*b* and a cylindrical spool 16*a*, 16*b* disposed within the cylindrical drum shell 14*a*, 14*b* and supporting the cylindrical drum shell 14*a*, 14*b*, and a sprung mass 32 rotationally coupled to the cylindrical spool along an axis of rotation 20 of the cylindrical drum shell 14*a*, 14*b* and the cylindrical spool 16*a*, 16*b*. The sprung mass 32 has a second center of gravity G2 that is lower than the first center of gravity G1 when the surface compactor machine is in a stationary position. The sprung mass 32 includes a traction system 34*a*, 34*b* including a traction motor 36*a*, 36*b* and a slewing gear 38*a*, 38*b* coupled to the traction motor. The traction system 34*a*, 34*b* is configured to rotate the sprung mass 32 relative to the cylindrical spool 16*a*, 16*b* about the axis of rotation 20. When the surface compactor machine 10 is in the stationary position, the first center of gravity G1 of the unsprung mass 22 and the second center of gravity G2 of the sprung mass 32 are in vertical alignment, and when the traction system 34*a*, 34*b* rotates the sprung mass 32 relative to the cylindrical spool 16*a*, 16*b* about the axis of rotation 20, the second center of gravity G2 of the sprung mass 32 is rotated out of vertical alignment with the first center of gravity G1 of the unsprung mass 22, thereby imparting torque to the cylindrical spool 16*a*, 16*b* that causes rotation of the cylindrical drum 12*a*, 12*b*.

Accordingly, as described above, the sprung mass 32, which includes all components other than the drum 12*a*, 12*b* and the eccentric assembly 18, is connected with the drum 12*a*, 12*b* by a slewing gear 38*a*, 38*b* including slewing bearings. The sprung mass 32 has a center of gravity that is displaced from the center of the slewing bearing. Therefore, gravity works to maintain the designed position of the sprung mass 32 without any additional controls or actuators. Heavy components of the sprung mass, such as an internal combustion engine, generator, ultra capacitors, counterweights, etc., are mounted as low as possible in order to keep the frame 60*a*, 60*b* in a horizontal position without active control.

Some embodiments include symmetrical electrical powertrains for both halves of the split drum 12*a*, 12*b*. Moreover, each drum 12*a*, 12*b* includes an electrical traction motor 36*a*, 36*b* with a reduction gear 46*a*, 46*b* and slewing gear 38*a*, 38*b* for driving the drum 12*a*, 12*b*.

To better utilize space inside the drum 14*a*, 14*b*, and to protect components from vibrations, the shock isolators 26*a*, 26*b* are mounted directly to the drum spools 16*a*, 16*b*.

Various elements of the machine could be modified. For example, in some embodiments, the engine 54 and generator could be omitted and the drive motors could be powered from batteries/ultra capacitors and be fully electric. The angular planetary gear 46*a*, 46*b* could be replaced by straight planetary gear provided that the drive motor 36*a*, 36*b* were rotated by 90 degrees. The slewing gear 38*a*, 38*b* could be functionally divided into separate units of bearing and gear with internal engagement. There could also be one wrapping frame 60*a*, 60*b* at the top of the machine 10 with tanks and space for electronics. Gyro stabilization could also optionally be provided. The electrical safety brake could be implemented into the drive motor 36*a*, 36*b* or its function could be performed by inline disc brakes operated with compressed air. Many other such modifications are possible and could be made within the scope of the inventive concepts.

While embodiments of the inventive concepts are illustrated and described herein, the device may be embodied in many different configurations, forms and materials. The present disclosure is to be considered as an exemplification of the principles of the inventive concepts and the associated functional specifications for their construction and is not intended to limit the inventive concepts to the embodiments illustrated. Those skilled in the art will envision many other possible variations within the scope of the present inventive concepts.

The foregoing description of the embodiments of the inventive concepts has been presented for the purpose of illustration and is not intended to be exhaustive or to limit the invention to the precise forms disclosed. Persons skilled in the relevant art can appreciate that many modifications and variations are possible in light of the above teachings. It is therefore intended that the scope of the inventive concepts be limited not by this detailed description, but rather by the claims appended hereto.

What is claimed is:

1. A surface compactor machine, comprising:

a cylindrical drum comprising a cylindrical drum shell and a cylindrical spool disposed within the cylindrical drum shell and supporting the cylindrical drum shell, the cylindrical drum shell and the cylindrical spool having an axis of rotation;

an eccentric assembly mechanically coupled to the cylindrical drum and arranged to impart vibration to the cylindrical drum when the eccentric assembly is rotated, wherein the cylindrical drum and the eccentric assembly form part of an unsprung mass having a combined first center of gravity;

a head plate affixed to the cylindrical spool through a shock isolator; and a sprung mass rotationally coupled to the head plate along the axis of rotation, wherein the sprung mass comprises a plurality of components having a combined second center of gravity that is lower than the first center of gravity when the surface compactor machine is in a stationary position;

wherein the sprung mass comprises a traction system including a traction motor and a slewing gear coupled to the traction motor, wherein the traction system is configured to rotate the sprung mass relative to the unsprung mass about the axis of rotation.

2. The surface compactor machine of claim 1, wherein the shock isolator provides vibrational isolation of the sprung mass from vibration of the cylindrical drum generated by the eccentric assembly.

3. The surface compactor machine of claim 1, wherein the slewing gear is coupled to the head plate.

4. The surface compactor machine of claim 1, wherein the traction motor is coupled to the slewing gear through a planetary gear.

5. The surface compactor machine of claim 1, wherein the traction system comprises a drive shaft coupled to the traction motor and the slewing gear and a safety brake coupled to the drive shaft.

6. The surface compactor machine of claim 1, wherein:

the cylindrical drum shell comprises a first cylindrical drum shell and a second cylindrical drum shell;

the cylindrical spool comprises a first cylindrical spool within first cylindrical drum shell and a second cylindrical spool within second cylindrical drum shell, wherein the first cylindrical spool is rotationally coupled to the second cylindrical spool through a concentric slew bearing;

wherein the head plate comprises a first head plate that is coupled to the first cylindrical spool through at least one shock isolator;

the slewing gear comprises a first slewing gear;

the traction system comprises a first traction system that is coupled to the first head plate through the first slewing gear, the surface compactor machine further comprising:

a second head plate affixed to the second cylindrical spool through a second shock isolator; and a second traction system including a second traction motor and a second slewing gear coupled to the second traction motor, wherein the second traction system is configured to rotate the sprung mass relative to the second head plate about the axis of rotation.

7. The surface compactor machine of claim 1, wherein, when the surface compactor machine is in the stationary position, the first center of gravity of the unsprung mass and the second center of gravity of the sprung mass are in vertical alignment.

8. The surface compactor machine of claim 7, wherein, when the traction system rotates the sprung mass relative to the head plate about the axis of rotation, the second center of gravity of the sprung mass is rotated out of vertical alignment with the first center of gravity of the unsprung mass, thereby imparting torque to the cylindrical drum that causes rotation of the cylindrical drum.

9. The surface compactor machine of claim 8, wherein the rotation imparted to the cylindrical drum imparts linear motion of the cylindrical drum in a direction from the first center of gravity of the unsprung mass toward the second center of gravity of the sprung mass.

10. The surface compactor machine of claim 1, wherein the eccentric assembly comprises an eccentric shaft disposed within the cylindrical drum and rotationally driven by a vibration motor.

11. The surface compactor machine of claim 10, wherein the vibration motor is positioned outside the head plate relative to the cylindrical spool and is coupled to the eccentric shaft through a constant velocity joint.

12. The surface compactor machine of claim 1, further comprising:

a frame forming part of the sprung mass, wherein the traction system is mounted to the frame.

13. The surface compactor machine of claim 12, wherein the frame extends partially within a space defined by the cylindrical drum shell adjacent the cylindrical spool, and wherein a drive motor is disposed at least partially within the space defined by the cylindrical drum shell adjacent the cylindrical spool.

14. The surface compactor machine of claim 13, wherein the sprung mass further comprises:

an engine mounted on the frame;

a counterweight mounted on the frame; and/or a bumper mounted on the frame.

15. A surface compactor machine, comprising:

an unsprung mass having a first center of gravity, the unsprung mass comprising a cylindrical drum including a cylindrical drum shell and a cylindrical spool disposed within the cylindrical drum shell and supporting the cylindrical drum shell, the cylindrical drum shell and the cylindrical spool having an axis of rotation;

a sprung mass rotationally coupled to the cylindrical spool along the axis of rotation, wherein the sprung mass has a second center of gravity that is lower than the first center of gravity when the surface compactor machine is in a stationary position, and wherein the sprung mass comprises a traction system including a traction motor and a slewing gear coupled to the traction motor, wherein the traction system is configured to rotate the sprung mass relative to the cylindrical spool about the axis of rotation;

wherein, when the surface compactor machine is in the stationary position, the first center of gravity of the unsprung mass and the second center of gravity of the sprung mass are in vertical alignment, and when the traction system rotates the sprung mass relative to the cylindrical spool about the axis of rotation, the second center of gravity of the sprung mass is rotated out of vertical alignment with the first center of gravity of the unsprung mass, thereby imparting torque to the cylindrical spool that causes rotation of the cylindrical drum.

16. The surface compactor machine of claim 15, wherein the unsprung mass further comprises:

an eccentric assembly mechanically coupled to the cylindrical drum and arranged to impart vibration to the cylindrical drum when the eccentric assembly is rotated.

17. The surface compactor machine of claim 16, further comprising:

a head plate affixed to the cylindrical spool through a shock isolator and coupled to the slewing gear of the traction system, wherein the traction system is configured to rotate the sprung mass relative to the unsprung mass about the axis of rotation.

18. The surface compactor machine of claim 17, wherein the slewing gear comprises a slewing gear coupled to the head plate.

19. The surface compactor machine of claim 18, wherein the eccentric assembly comprises an eccentric shaft, the surface compactor machine further comprising:

a vibration motor coupled to the eccentric shaft, wherein the vibration motor is positioned outside the head plate relative to the cylindrical spool and is coupled to the eccentric shaft through a constant velocity joint.

20. A surface compactor machine, comprising:

a cylindrical drum comprising a cylindrical drum shell and a cylindrical spool disposed within the cylindrical drum shell and supporting the cylindrical drum shell, the cylindrical drum shell and the cylindrical spool having an axis of rotation;

an eccentric shaft mechanically coupled to the cylindrical drum and arranged to impart vibration to the cylindrical drum when the eccentric shaft is rotated, wherein the cylindrical drum and the eccentric shaft form part of an unsprung mass having a combined first center of gravity;

a head plate (affixed to the cylindrical spool through a shock isolator;

a shock isolated vibration motor coupled to the vibration shaft, wherein the vibration motor is positioned outside the cylindrical spool and is coupled to the vibration shaft through a constant velocity joint; and a sprung mass rotationally coupled to the head plate along the axis of rotation, wherein the sprung mass has a second center of gravity that is lower than the first center of gravity when the surface compactor machine is in a stationary position.

* * * * *